(12) United States Patent
Subramanian

(10) Patent No.: US 6,765,783 B2
(45) Date of Patent: Jul. 20, 2004

(54) COPPER TANTALATE COMPOSITIONS CONTAINING TRIVALENT CATIONS

(75) Inventor: Munirpallam A. Subramanian, Kennett Square, PA (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 14 days.

(21) Appl. No.: 10/313,842

(22) Filed: Dec. 6, 2002

(65) Prior Publication Data

US 2003/0151882 A1 Aug. 14, 2003

Related U.S. Application Data

(60) Provisional application No. 60/343,397, filed on Dec. 21, 2001.

(51) Int. Cl.[7] .............................. H01G 4/06; H01G 4/12

(52) U.S. Cl. ................... 361/311; 361/321.4; 361/321.5

(58) Field of Search ...................... 361/311–312, 321.4, 361/321.5; 501/137–139

(56) References Cited

PUBLICATIONS

H. Nguyen Ngoc, et al., "Investigations on the mixed conductivity of copper tantalate", Solic State Ionics, (1996) pp. 183–192, vol. 92, France.
International Search Report dated Aug. 5, 2003.

*Primary Examiner*—Anthony Dinkins

(57) ABSTRACT

This invention provides compositions of the formula $Cu_3Ta_3MO_{12}$ wherein M is Al, Ga, Fe, Cr, Sc or mixtures thereof. These compositions have high dielectric constant and low loss over a frequency range of from 1 kHz to 1 MHz.

24 Claims, No Drawings

COPPER TANTALATE COMPOSITIONS CONTAINING TRIVALENT CATIONS

This application claims benefit of provisional application No. 60/343,397, filed Dec. 21, 2001.

FIELD OF THE INVENTION

This invention relates to novel compositions of the formula $Cu_3Ta_3MO_{12}$ wherein M is Al, Ga, Fe, Cr, Sc or mixtures thereof.

BACKGROUND OF THE INVENTION

The use of dielectric materials to increase capacitance is well known and long-used. Earlier capacitor dielectrics fell into two categories. The first category of dielectrics has a relatively temperature-independent dielectric constant but the value of the dielectric constant is low, e.g., 5–10. Materials such as electrical porcelain and mica fall in this category. The second category of dielectrics has very high dielectric constant, e.g., 1000 or more, but they are quite frequency dependent. An example is barium titanate, $BaTiO_3$.

Since the capacitance is proportional to the dielectric constant, high dielectric constant materials are desired. In order to perform acceptably in electronic circuits the dielectric must have a dielectric constant that exhibits minimal frequency dependence. It is also desirable to have the loss or dissipation factor as small as possible.

SUMMARY OF THE INVENTION

This invention provides compositions of the formula $Cu_3Ta_3MO_{12}$ wherein M is Al, Ga, Fe, Cr, Sc or mixtures thereof. These compositions are useful, for example, in electronic devices as they have high dielectric constant and low loss over a frequency range of from 1 kHz to 1 MHz. They are especially useful as capacitors in electronic devices such as phase shifters, matching networks, oscillators, filters, resonators, and antennas comprising interdigital and trilayer capacitors, coplanar waveguides and microstrips. Also provided is the use of the composition in a process of making a capacitor.

DETAILED DESCRIPTION

The compositions of this invention are $Cu_3Ta_3MO_{12}$ wherein M is Al, Ga, Fe, Cr, Sc or mixtures thereof. These compositions are useful, for example, in electronic devices as they have dielectric properties that provide advantages in such devices requiring a high dielectric constant with minimal frequency dependence and low loss. These compositions have particular use as a capacitor.

The compositions of this invention can be synthesized by the following procedure. Stoichiometric amounts of the starting materials are thoroughly mixed. The starting materials $M_2O_3$ (M is Al, Ga, Fe, Cr, Sc or mixtures thereof), CuO and $Ta_2O_5$ are preferred. The mixed powder of starting materials is calcined at about 900° C. for about 12 hours. The calcined powder is reground and pressed to 12.7 mm diameter/1–2 mm thick disks. The disks are sintered in air at about 950° C. for 24 hours. In both the calcining and sintering steps, the temperature ramping up rate is about 200° C./hour from room temperature, i.e., about 20° C., to the calcining or sintering temperature and the cooling rate is about 150° C./hour from the calcining or sintering temperature to room temperature, i.e., about 20° C.

All of the $Cu_3Ta_3MO_{12}$ phases of this invention crystallize in a cubic perovskite-related Im3 structure.

Dielectric measurements can be carried out on the disk samples. The faces of the disk-shaped samples are polished with a fine-grit sand or emery paper. Silver paint electrodes are applied on the faces and dried at 70–100° C. The capacitance and the dielectric loss measurements can be performed by the two-terminal method using Hewlett-Packard 4275A and 4284A LCR bridges at a temperature of 25° C. over a frequency range of from 1 kHz to 1 MHz. The capacitance, C, and the dissipation factor are read directly from the bridge. The dielectric constant (K) is calculated from the measured capacitance, C in picofarads, from the relationship, K=(100 C t)/(8.854 A), where t is thickness of the disk shaped sample in cm and A is the area of the electrode in $cm^2$.

EXAMPLES OF THE INVENTION

EXAMPLES 1–5

The compositions $Cu_3Ta_3MO_{12}$ of Examples 1–5 wherein M is Al, Ga, Fe, Cr and Sc respectively, were made using the following procedure. For each example, appropriate amounts of the starting oxides $M_2O_3$, CuO and $Ta_2O_5$ were weighed according to the stoichiometric ratios and mixed thoroughly in an agate mortar. The gram amounts of the starting materials used are shown in Table 1.

TABLE 1

| Ex | Composition | $M_2O_3$ | CuO | $Ta_2O_5$ |
|---|---|---|---|---|
| 1 | $Cu_3Ta_3AlO_{12}$ | 0.0856 ($Al_2O_3$) | 0.4008 | 1.1134 |
| 2 | $Cu_3Ta_3GaO_{12}$ | 0.1506 ($Ga_2O_3$) | 0.3836 | 1.0656 |
| 3 | $Cu_3Ta_3FeO_{12}$ | 0.4881 ($Fe_2O_3$) | 1.459 | 4.0527 |
| 4 | $Cu_3Ta_3CrO_{12}$ | 0.1243 ($Cr_2O_3$) | 0.3906 | 1.0849 |
| 5 | $Cu_3Ta_3ScO_{12}$ | 0.1137 ($Sc_2O_3$) | 0.3935 | 1.0929 |

In each example, the mixed powder was calcined at 900° C. for 12 hours. The calcined powder was reground and pressed to 12.7 mm diameter/1–2mm thick disks. The disks were sintered in air at 1000–1100° C. for 24 hours. In both the calcining and sintering steps, the temperature was increased from room temperature, i.e., about 20° C., to the calcining or sintering temperature at a rate of 200° C./hour and the temperature was decreased from the calcining or sintering temperature to room temperature, i.e., about 20° C., at a rate of 150° C./hour.

X-ray powder diffraction patterns were recorded with a Siemens D5000 diffractometer. The data showed all samples crystallized in a cubic perovskite-related Im3 structure. The measured lattice parameters are listed in Table 2.

TABLE 2

| Ex | Composition | Lattice Parameter (nm) |
|---|---|---|
| 1 | $Cu_3Ta_3AlO_{12}$ | 0.7480 (1) |
| 2 | $Cu_3Ta_3GaO_{12}$ | 0.7489 (1) |
| 3 | $Cu_3Ta_3FeO_{12}$ | 0.7506 (1) |

TABLE 2-continued

| Ex | Composition | Lattice Parameter (nm) |
|----|-------------|------------------------|
| 4 | $Cu_3Ta_3CrO_{12}$ | 0.7501 (1) |
| 5 | $Cu_3Ta_3ScO_{12}$ | 0.7520 (1) |

The disk samples were polished to produce flat uniform surfaces and electroded with silver paint. The painted samples were dried at 70–100° C. overnight. Capacitance and loss tangent measurements were done at room temperature using a HP-4284A LCR meter over a frequency range of from 1 kHz to 1 MHz. The dielectric constants are high and the loss factors are low. Variations of dielectric constant (K) and loss factor (tan δ) over a range of frequency from $10^3$ Hz to $10^6$ Hz measured at 25° C. for the samples of Examples 1–5 are shown in Table 3. The dielectric constants and loss factors have minimal frequency dependence over 3 orders of magnitude change in frequency.

TABLE 3

| | $10^3$ Hz | | $10^4$ Hz | | $10^5$ Hz | | $10^6$ Hz | |
|---|---|---|---|---|---|---|---|---|
| Ex. | K | tan δ | K | Tan δ | K | tan δ | K | tan δ |
| 1 | 1135 | 0.083 | 1129 | 0.075 | 1120 | 0.064 | 1136 | 0.059 |
| 2 | 1245 | 0.091 | 1214 | 0.083 | 1195 | 0.073 | 1186 | 0.087 |
| 3 | 680 | 0.114 | 708 | 0.098 | 715 | 0.105 | 645 | 0.108 |
| 4 | 720 | 0.145 | 707 | 0.123 | 647 | 0.112 | 673 | 0.107 |
| 5 | 885 | 0.093 | 853 | 0.084 | 846 | 0.065 | 851 | 0.072 |

What is claimed is:

1. A composition of the formula $Cu_3Ta_3MO_{12}$ wherein M is Al, Ga, Fe, Cr, Sc or mixtures thereof.
2. The composition of claim 1, wherein M is Al.
3. The composition of claim 1, wherein M is Ga.
4. The composition of claim 1, wherein M is Fe.
5. The composition of claim 1, wherein M is Cr.
6. The composition of claim 1, wherein M is Sc.
7. A capacitor comprising a dielectric material, wherein said dielectric material is comprised of a composition of the formula $Cu_3Ta_3MO_{12}$ wherein M is Al, Ga, Fe, Cr, Sc or mixtures thereof.
8. The capacitor of claim 7, wherein M is Al.
9. The capacitor of claim 7, wherein M is Ga.
10. The capacitor of claim 7, wherein M is Fe.
11. The capacitor of claim 7, wherein M is Cr.
12. The capacitor of claim 7, wherein M is Sc.
13. An electronic device comprising a capacitor with a dielectric material, wherein said dielectric material is comprised of a composition of the formula $Cu_3Ta_3MO_{12}$ wherein M is Al, Ga, Fe, Cr, Sc or mixtures thereof.
14. The electronic device of claim 13, wherein M is Al.
15. The electronic device of claim 13, wherein M is Ga.
16. The electronic device of claim 13, wherein M is Fe.
17. The electronic device of claim 13, wherein M is Cr.
18. The electronic device of claim 13, wherein M is Sc.
19. A process for making a capacitor comprising (a) providing a dielectric material wherein said dielectric material is comprised of a composition of the formula $Cu_3Ta_3MO_{12}$ wherein M is Al, Ga, Fe, Cr, Sc or mixtures thereof; and (b) making a capacitor from the dielectric material.
20. The process of claim 19, wherein M is Al.
21. The process of claim 19, wherein M is Ga.
22. The process of claim 19, wherein M is Fe.
23. The process of claim 19, wherein M is Cr.
24. The process of claim 19, wherein M is Sc.

* * * * *